(12) United States Patent
Olorode et al.

(10) Patent No.: US 9,514,058 B2
(45) Date of Patent: Dec. 6, 2016

(54) LOCAL PAGE TRANSLATION AND PERMISSIONS STORAGE FOR THE PAGE WINDOW IN PROGRAM MEMORY CONTROLLER

(71) Applicant: Texas Instruments Incorporated, Dallas, TX (US)

(72) Inventors: Oluleye Olorode, Garland, TX (US); Ramakrishnan Venkatasubramanian, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 102 days.

(21) Appl. No.: 14/579,641

(22) Filed: Dec. 22, 2014

(65) Prior Publication Data

US 2016/0179695 A1 Jun. 23, 2016

(51) Int. Cl.
*G06F 12/00* (2006.01)
*G06F 12/10* (2016.01)

(52) U.S. Cl.
CPC ... *G06F 12/1009* (2013.01); *G06F 2212/1016* (2013.01); *G06F 2212/65* (2013.01)

(58) Field of Classification Search
CPC ............... G06F 12/1009; G06F 2212/1016; G06F 2212/65

USPC ......................................................... 711/207
See application file for complete search history.

(56) References Cited

U.S. PATENT DOCUMENTS 7,774,575 B2 * 8/2010 Seto ..................... G06F 3/0605
                                                                 711/100
9,183,084 B2   11/2015 Damodaran et al.

* cited by examiner

*Primary Examiner* — Matthew Bradley
(74) *Attorney, Agent, or Firm* — Robert D. Marshall, Jr.; Frank D. Cimino

(57) ABSTRACT

This invention provides a current page translation register storing virtual to physical address translation data for a single current page and optionally access permission data for the same page for program accesses. If an accessed address is within the current page, the address translation and permission data is accessed from current page translation register. This current page translation register provides an additional level of caching of this data above the typical translation look-aside buffer and micro translation look-aside buffer. The smaller size of the current page translation register provides faster page hit/miss determination and faster data access using less power than the typical architecture. This is helpful for program access which generally hits the current page more frequently than data access.

12 Claims, 9 Drawing Sheets

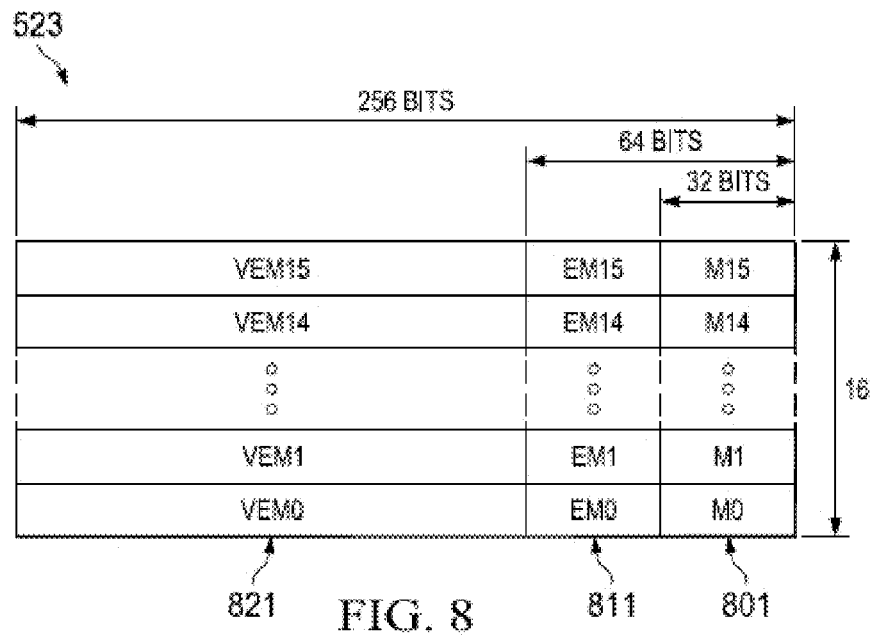
FIG. 8
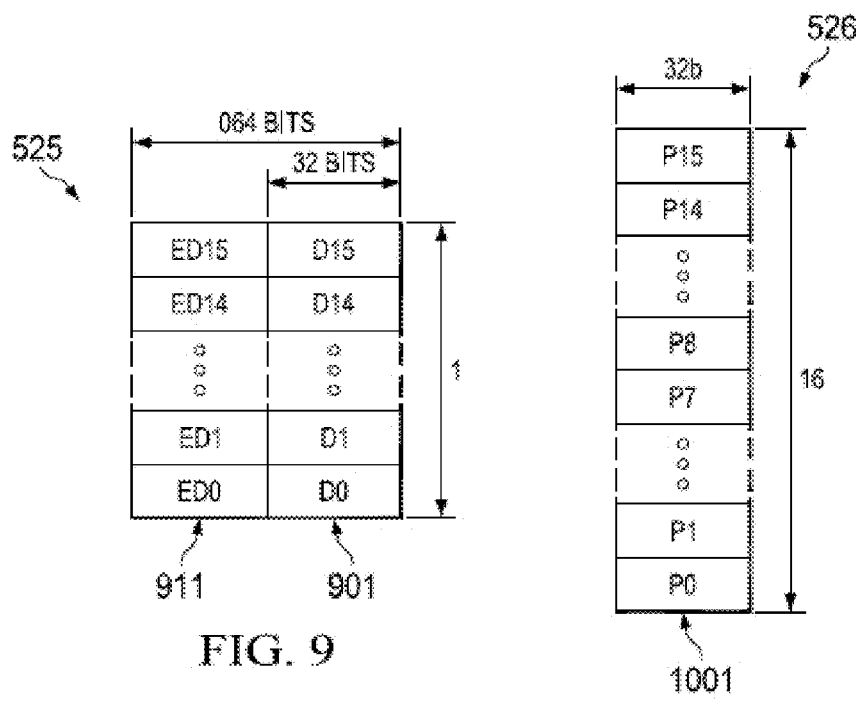
FIG. 9
FIG. 10

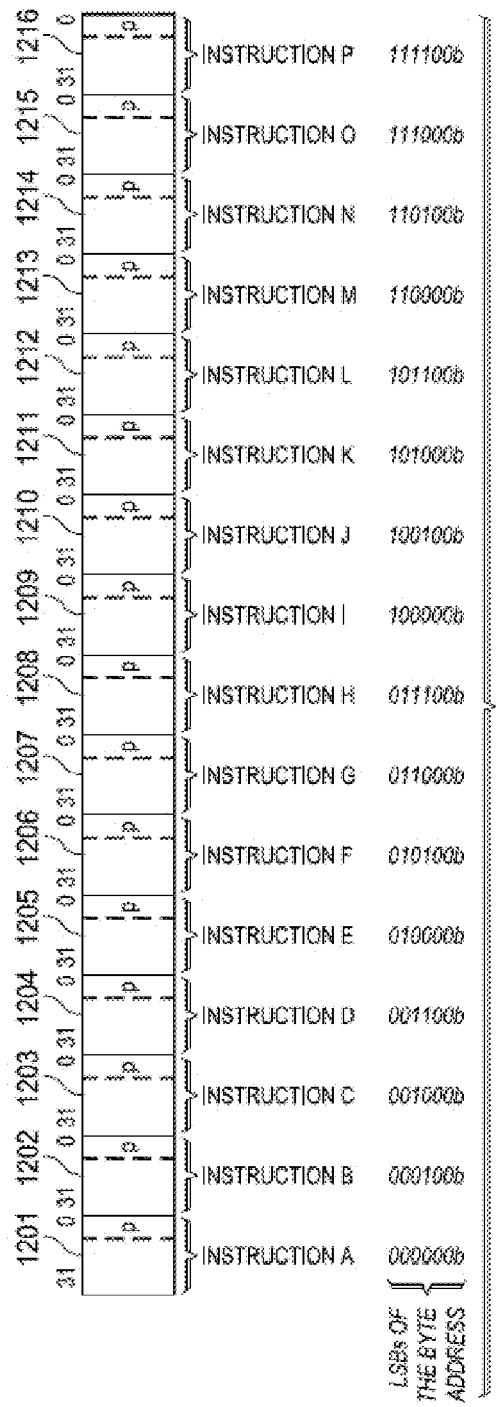
FIG. 12
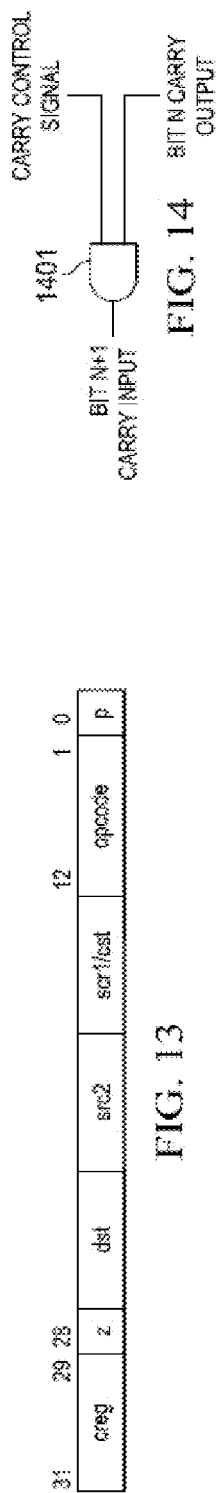
FIG. 13
FIG. 14

LOCAL PAGE TRANSLATION AND PERMISSIONS STORAGE FOR THE PAGE WINDOW IN PROGRAM MEMORY CONTROLLER

TECHNICAL FIELD OF THE INVENTION

The technical field of this invention is digital data processing and more specifically memory page translation and permissions storage in a program memory controller.

BACKGROUND OF THE INVENTION

In a processor supporting virtual memory, the virtual address provided by the CPU has to be translated to a physical address. This is typically accomplished by a Memory management unit (MMU). The MMU typically uses a μTLB (micro-translation look-aside buffer) as a cache of the page translation entries stored in the MMU. Every virtual address requested by CPU needs to be translated to the physical address by the μTLB/MMU for memory access. This is typically performed on page boundaries.

The virtual address to physical address translation happens at the page boundaries (the lowest granularity of page size being 4K). If an access address to be translated is a hit in μTLB, translation takes place in a single cycle. But if the access address is a miss in μTLB, the translation data for that page has to be requested from the MMU. This translation data fetch may take tens to hundreds of cycles depending on the page translation and page table walk latency in the MMU.

The MMU/μTLB typically also provides permission information for the translations. This permission information is stored in the L1I cache because for L1I hits, the permission information is needed to service the request.

If every virtual address is looked up through the μTLB, and if the μTLB entries can be invalidated by the MMU, then there will probably be a long μTLB miss latency. This will also result in increased dynamic power consumption if the μTLB is implemented in SRAM memory.

SUMMARY OF THE INVENTION

This invention provides a current page translation register storing virtual to physical address translation data for a current page and optionally access permission data for the same page for program accesses. If an accessed address is within the current page, the address translation and permission data is accessed from current page translation register. This current page translation register provides an additional level of caching of this data above the typical translation look-aside buffer and micro translation look-aside buffer. The smaller size of the current page translation register provides faster page hit/miss determination and faster data access using less power than the typical architecture. This is helpful for program access which generally hits the current page more frequently than data access.

BRIEF DESCRIPTION OF THE DRAWINGS

These and other aspects of this invention are illustrated in the drawings, in which:

FIG. 8 illustrates the local vector register file shared by the multiply and correlation functional units;

FIG. 9 illustrates local register file of the load/store unit;

FIG. 10 illustrates the predicate register file;

FIG. 12 illustrates sixteen instructions of a single fetch packet;

FIG. 13 illustrates an example of the instruction coding of instructions used by this invention;

FIG. 14 illustrates the carry control for SIMD operations according to this invention;

DETAILED DESCRIPTION OF PREFERRED EMBODIMENTS

Figure 1:
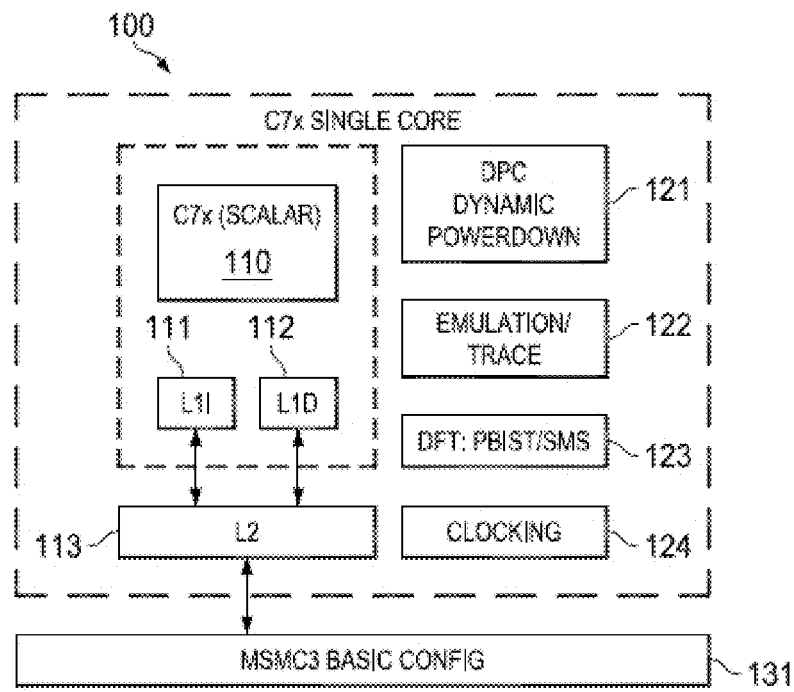
FIG. 1 illustrates a single core scalar processor according to one embodiment of this invention.

FIG. 1 illustrates a single core scalar processor according to one embodiment of this invention. Single core processor 100 includes a scalar central processing unit (CPU) 110 coupled to separate level one instruction cache (L1I) 111 and level one data cache (L1D) 112. Central processing unit core 110 could be constructed as known in the art and would typically include a register file, an integer arithmetic logic unit, an integer multiplier and program flow control units. Single core processor 100 includes a level two combined instruction/data cache (L2) 113 that holds both instructions and data. In the preferred embodiment scalar central processing unit (CPU) 110, level one instruction cache (L1I) 111, level one data cache (L1D) 112 and level two combined instruction/data cache (L2) 113 are formed on a single integrated circuit.

In a preferred embodiment this single integrated circuit also includes auxiliary circuits such as power control circuit 121, emulation/trace circuits 122, design for test (DST) programmable built-in self test (PBIST) circuit 123 and clocking circuit 124. External to CPU 110 and possibly integrated on single integrated circuit 100 is memory controller 131.

CPU 110 operates under program control to perform data processing operations upon defined data. The program controlling CPU 110 consists of a plurality of instructions that must be fetched before decoding and execution. Single core processor 100 includes a number of cache memories. FIG. 1 illustrates a pair of first level caches. Level one instruction cache (L1I) 111 stores instructions used by CPU 110. CPU 110 first attempts to access any instruction from level one instruction cache 121. Level one data cache (L1D) 112 stores data used by CPU 110. CPU 110 first attempts to access any required data from level one data cache 112. The two level one caches (L1I 111 and L1D 112) are backed by a level two unified cache (L2) 113. In the event of a cache miss to level one instruction cache 111 or to level one data cache 112, the requested instruction or data is sought from level two unified cache 113. If the requested instruction or data is stored in level two unified cache 113, then it is supplied to the requesting level one cache for supply to central processing unit core 110. As is known in the art, the requested instruction or data may be simultaneously supplied to both the requesting cache and CPU 110 to speed use.

Level two unified cache 113 is further coupled to higher level memory systems via memory controller 131. Memory controller 131 handles cache misses in level two unified cache 113 by accessing external memory (not shown in FIG. 1). Memory controller 131 handles all memory centric functions such as cacheabilty determination, error detection and correction, address translation and the like. Single core processor 100 may be a part of a multiprocessor system. In that case memory controller 131 handles data transfer between processors and maintains cache coherence among processors.

Figure 2:
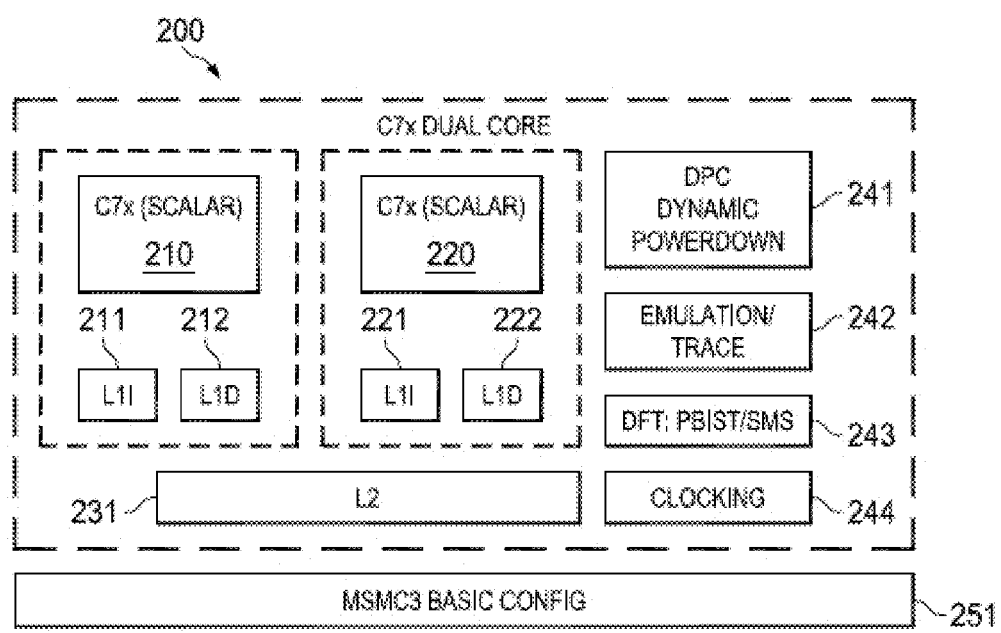
FIG. 2 illustrates a dual core scalar processor according to another embodiment of this invention.

FIG. 2 illustrates a dual core processor according to another embodiment of this invention. Dual core processor 200 includes first CPU 210 coupled to separate level one instruction cache (L1I) 211 and level one data cache (L1D) 212 and second CPU 220 coupled to separate level one instruction cache (L1I) 221 and level one data cache (L1D) 212. Central processing units 210 and 220 are preferably constructed similar to CPU 110 illustrated in FIG. 1. Dual core processor 200 includes a single shared level two combined instruction/data cache (L2) 231 supporting all four level one caches (L1I 211, L1D 212, L1I 221 and L1D 222). In the preferred embodiment CPU 210, level one instruction cache (L1I) 211, level one data cache (L1D) 212, CPU 220, level one instruction cache (L1I) 221, level one data cache (L1D) 222 and level two combined instruction/data cache (L2) 231 are formed on a single integrated circuit. This single integrated circuit preferably also includes auxiliary circuits such as power control circuit 241, emulation/trace circuits 242, design for test (DST) programmable built-in self test (PBIST) circuit 243 and clocking circuit 244. This single integrated circuit may also include memory controller 251.

Figure 3:
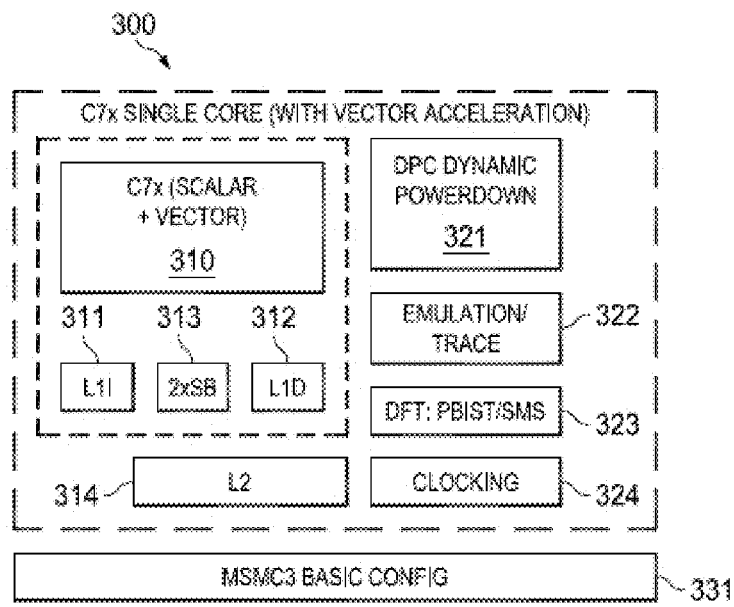
FIG. 3 illustrates a single core vector processor according to a further embodiment of this invention.
Figure 4:
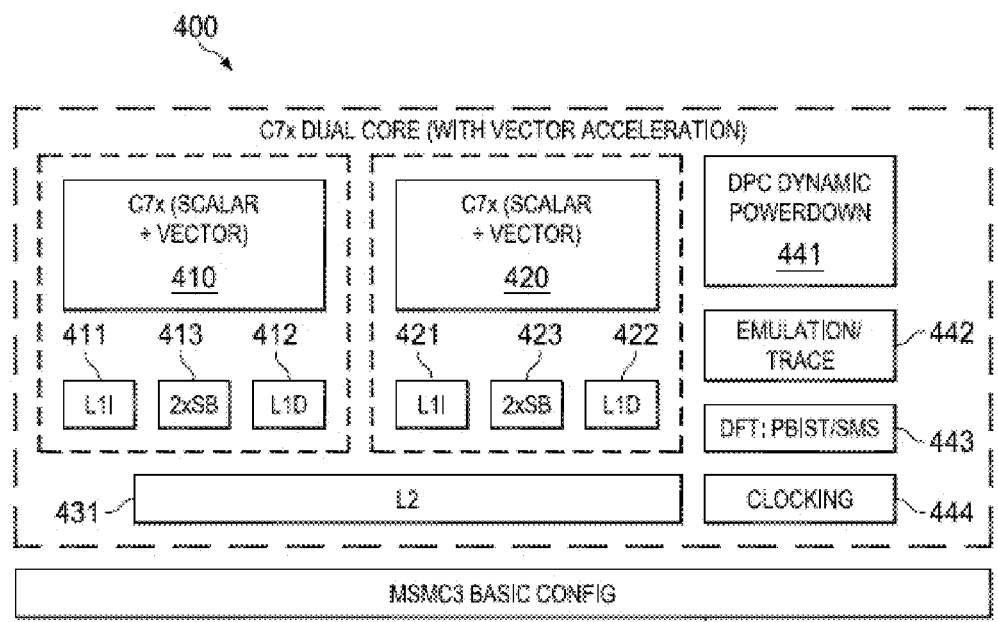
FIG. 4 illustrates a dual core vector processor according to a further embodiment of this invention.

FIGS. 3 and 4 illustrate single core and dual core processors similar to that shown respectively in FIGS. 1 and 2. FIGS. 3 and 4 differ from FIGS. 1 and 2 in showing vector central processing units. As further described below Single core vector processor 300 includes a vector CPU 310. Dual core vector processor 400 includes two vector CPUs 410 and 420. Vector CPUs 310, 410 and 420 include wider data path operational units and wider data registers than the corresponding scalar CPUs 110, 210 and 220.

Figure 5:
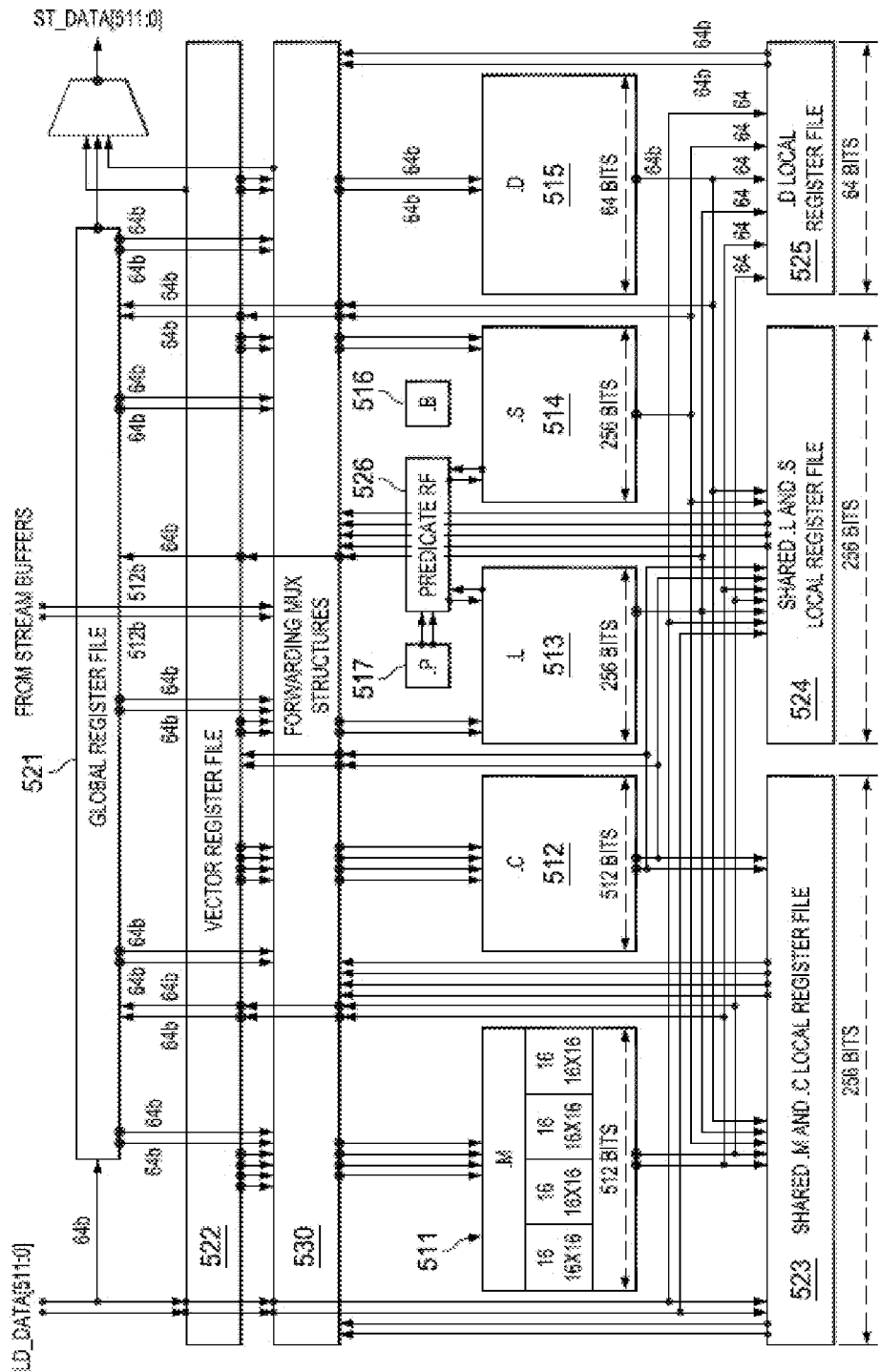
FIG. 5 illustrates construction of one embodiment of the CPU of this invention.

Vector CPUs 310, 410 and 420 further differ from the corresponding scalar CPUs 110, 210 and 220 in the inclusion of streaming engine 313 (FIG. 3) and streaming engines 413 and 423 (FIG. 5). Streaming engines 313, 413 and 423 are similar. Streaming engine 313 transfers data from level two unified cache 313 (L2) to a vector CPU 310. Streaming engine 413 transfers data from level two unified cache 431 to vector CPU 410. Streaming engine 423 transfers data from level two unified cache 431 to vector CPU 420. In accordance with the preferred embodiment each streaming engine 313, 413 and 423 manages up to two data streams.

Each streaming engine 313, 413 and 423 transfer data in certain restricted circumstances. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have fixed sequence of elements. Thus programs cannot seek randomly within the stream. The stream data is read-only while active. Programs cannot write to a stream while simultaneously reading from it. Once a stream is opened the streaming engine: calculates the address; fetches the defined data type from level two unified cache; performs data type manipulation such as zero extension, sign extension, data element sorting/swapping such as matrix transposition; and delivers the data directly to the programmed execution unit within the CPU. Streaming engines are thus useful for real-time digital filtering operations on well-behaved data. Streaming engines free these memory fetch tasks from the corresponding CPU enabling other processing functions.

The streaming engines provide the following benefits. They permit multi-dimensional memory accesses. They increase the available bandwidth to the functional units. They minimize the number of cache miss stalls since the stream buffer can bypass L1D cache. They reduce the number of scalar operations required in the loop to maintain. They manage the address pointers. They handle address generation automatically freeing up the address generation instruction slots and the .D unit for other computations.

FIG. 5 illustrates construction of one embodiment of the CPU of this invention. Except where noted this description covers both scalar CPUs and vector CPUs. The CPU of this invention includes plural execution units multiply unit 511 (.M), correlation unit 512 (.C), arithmetic unit 513 (.L), arithmetic unit 514 (.S), load/store unit 515 (.D), branch unit 516 (.B) and predication unit 517 (.P). The operation and relationships of these execution units are detailed below.

Multiply unit 511 primarily performs multiplications. Multiply unit 511 accepts up to two double vector operands and produces up to one double vector result. Multiply unit 511 is instruction configurable to perform the following operations: various integer multiply operations, with precision ranging from 8-bits to 64-bits; various regular and complex dot product operations; and various floating point multiply operations; bit-wise logical operations; moves; as well as adds and subtracts. As illustrated in FIG. 5 multiply unit 511 includes hardware for four simultaneous 16 bit by 16 bit multiplications. Multiply unit 511 may access global scalar register file 521, global vector register file 522 and shared .M and .C. local register 523 file in a manner described below. Forwarding multiplexer 530 mediates the data transfer between global scalar register file 521, global vector register file 522, the corresponding streaming engine and multiply unit 511.

Correlation unit 512 (.C) accepts up to two double vector operands and produces up to one double vector result. Correlation unit 512 supports these major operations. In support of WCDMA "Rake" and "Search" instructions correlation unit 512 performs up to 512 2-bit PN*8-bit I/Q complex multiplies per clock cycle. Correlation unit 512 performs 8-bit and 16-bit Sum-of-Absolute-Difference (SAD) calculations performing up to 512 SADs per clock cycle. Correlation unit 512 performs horizontal add and horizontal min/max instructions. Correlation unit 512 performs vector permutes instructions. Correlation unit 512 includes contains 8 256-bit wide control registers. These control registers are used to control the operations of certain correlation unit instructions. Correlation unit 512 may access global scalar register file 521, global vector register file 522 and shared .M and .C. local register file 523 in a manner described below. Forwarding multiplexer 530 mediates the data transfer between global scalar register file 521, global vector register file 522, the corresponding streaming engine and correlation unit 512.

CPU 500 includes two arithmetic units: arithmetic unit 513 (.L) and arithmetic unit 514 (.S). Each arithmetic unit 513 and arithmetic unit 514 accepts up to two vector operands and produces one vector result. The compute units support these major operations. Arithmetic unit 513 and arithmetic unit 514 perform various single-instruction-multiple-data (SIMD) fixed point arithmetic operations with precision ranging from 8-bit to 64-bits. Arithmetic unit 513 and arithmetic unit 514 perform various vector compare and minimum/maximum instructions which write results directly to predicate register file 526 (further described below). These comparisons include A=B, A>B, A≥B, A<B and A≤B. If the comparison is correct, a 1 bit is stored in the corresponding bit position within the predicate register. If the comparison fails, a 0 is stored in the corresponding bit position within the predicate register. Vector compare instructions assume byte (8 bit) data and thus generate 32 single bit results. Arithmetic unit 513 and arithmetic unit 514 perform various vector operations using a designated predicate register as explained below. Arithmetic unit 513 and arithmetic unit 514 perform various SIMD floating point arithmetic operations with precision ranging from half-precision (16-bits), single precision (32-bits) to double precision (64-bits). Arithmetic unit 513 and arithmetic unit 514 perform specialized instructions to speed up various algorithms and functions. Arithmetic unit 513 and arithmetic unit 514 may access global scalar register file 521, global vector register file 522, shared .L and .S local register file 524 and predicate register file 526. Forwarding multiplexer 530 mediates the data transfer between global scalar register file 521, global vector register file 522, the corresponding streaming engine and arithmetic units 513 and 514.

Load/store unit 515 (.D) is primarily used for address calculations. Load/store unit 515 is expanded to accept scalar operands up to 64-bits and produces scalar result up to 64-bits. Load/store unit 515 includes additional hardware to perform data manipulations such as swapping, pack and unpack on the load and store data to reduce workloads on the other units. Load/store unit 515 can send out one load or store request each clock cycle along with the 44-bit physical address to level one data cache (L1D). Load or store data width can be 32-bits, 64-bits, 256-bits or 512-bits. Load/store unit 515 supports these major operations: 64-bit SIMD arithmetic operations; 64-bit bit-wise logical operations; and scalar and vector load and store data manipulations. Load/store unit 515 preferably includes a micro-TLB (table look-aside buffer) block to perform address translation from a 48-bit virtual address to a 44-bit physical address. Load/store unit 515 may access global scalar register file 521, global vector register file 522 and .D local register file 525 in a manner described below. Forwarding multiplexer 530 mediates the data transfer between global scalar register file 521, global vector register file 522, the corresponding streaming engine and load/store unit 515.

Branch unit 516 (.B) calculates branch addresses, performs branch predictions, and alters control flows dependent on the outcome of the prediction.

Predication unit 517 (.P) is a small control unit which performs basic operations on vector predication registers. Predication unit 517 has direct access to the vector predication registers 526. Predication unit 517 performs different bit operations on the predication registers such as AND, ANDN, OR, XOR, NOR, BITR, NEG, SET, BITCNT (bit count), RMBD (right most bit detect), BIT Decimate and Expand, etc.

Figure 6:
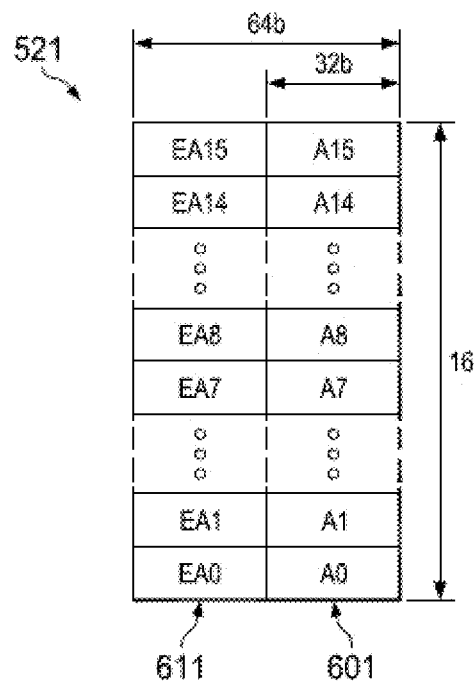
FIG. 6 illustrates the global scalar register file.

FIG. 6 illustrates global scalar register file 521. There are 16 independent 64-bit wide scalar registers. Each register of global scalar register file 521 can be read as 32-bits scalar data (designated registers A0 to A15 601) or 64-bits of scalar data (designated registers EA0 to EA15 611). However, writes are always 64-bit, zero-extended to fill up to 64-bits if needed. All scalar instructions of all functional units can read or write to global scalar register file 521. The instruction type determines the data size. Global scalar register file 521 supports data types ranging in size from 8-bits through 64-bits. A vector instruction can also write to the 64-bit global scalar registers 521 with the upper 192 bit data of the vector discarded. A vector instruction can also read 64-bit data from the global scalar register file 511. In this case the operand is zero-extended in the upper 192-bit to form an input vector.

Figure 7:
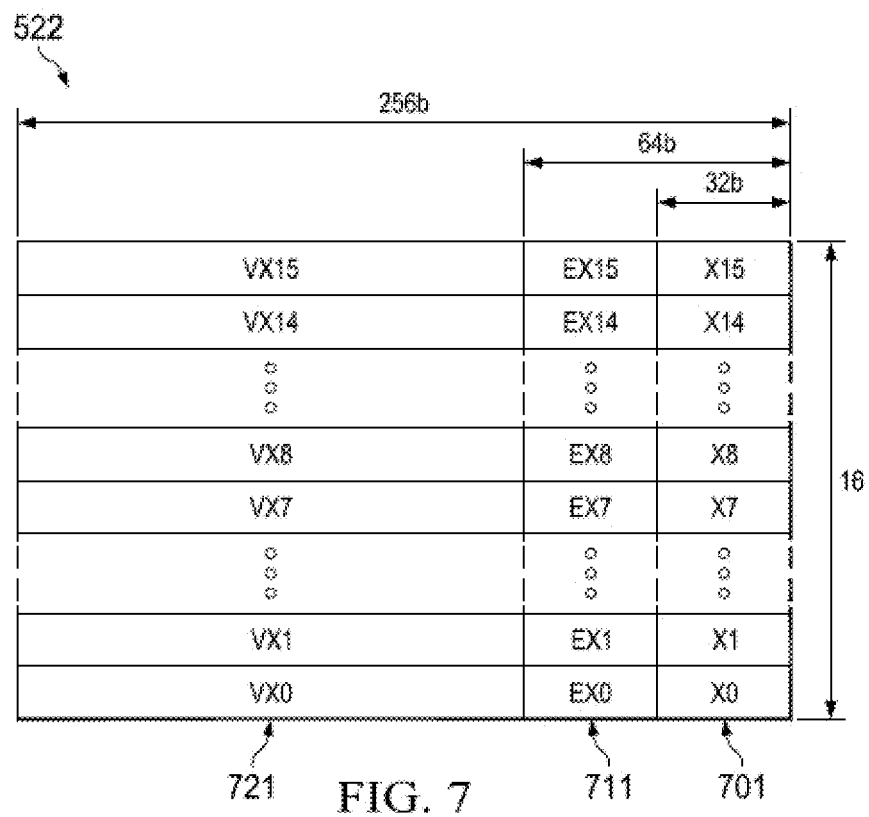
FIG. 7 illustrates global vector register file.

FIG. 7 illustrates global vector register file 522. There are 16 independent 256-bit wide vector registers. Each register of global vector register file 522 can be read as 32-bits scalar data (designated registers X0 to X15 701), 64-bits of scalar data (designated registers EX0 to EX15 711), 256-bit vector data (designated registers VX0 to VX15 721) or 512-bit double vector data (designated DVX0 to DVX7, not illustrated). In the current embodiment only multiply unit 511 and correlation unit 512 may execute double vector instructions. All vector instructions of all functional units can read or write to global vector register file 522. Any scalar instruction of any functional unit can also access the low 32 or 64 bits of a global vector register file 522 register for read or write. The instruction type determines the data size.

FIG. 8 illustrates local vector register file 523. There are 16 independent 256-bit wide vector registers. Each register of local vector register file 523 can be read as 32-bits scalar data (designated registers M0 to M15 701), 64-bits of scalar data (designated registers EM0 to EM15 711), 256-bit vector data (designated registers VM0 to VM15 721) or 512-bit double vector data (designated DVM0 to DVM7, not illustrated). In the current embodiment only multiply unit 511 and correlation unit 512 may execute double vector instructions. All vector instructions of all functional units can write to local vector register file 523. Only instructions of multiply unit 511 and correlation unit 512 may read from local vector register file 523. The instruction type determines the data size.

Multiply unit 511 may operate upon double vectors (512-bit data). Multiply unit 511 may read double vector data from and write double vector data to global vector register file 521 and local vector register file 523. Register designations DVXx and DVMx are mapped to global vector register file 521 and local vector register file 523 as follows.

TABLE 1

| Instruction Designation | Register Accessed |
| --- | --- |
| DVX0 | VX1:VX0 |
| DVX1 | VX3:VX2 |
| DVX2 | VX5:VX4 |
| DVX3 | VX7:VX6 |
| DVX4 | VX9:VX8 |
| DVX5 | VX11:VX10 |
| DVX6 | VX13:VX12 |
| DVX7 | VX15:VX14 |
| DVM0 | VM1:VM0 |
| DVM1 | VM3:VM2 |
| DVM2 | VM5:VM4 |
| DVM3 | VM7:VM6 |
| DVM4 | VM9:VM8 |
| DVM5 | VM11:VM10 |
| DVM6 | VM13:VM12 |
| DVM7 | VM15:VM14 |

Each double vector designation maps to a corresponding pair of adjacent vector registers in either global vector register 522 or local vector register 523. Designations DVX0 to DVX7 map to global vector register 522. Designations DVM0 to DVM7 map to local vector register 523.

Local vector register file 524 is similar to local vector register file 523. There are 16 independent 256-bit wide vector registers. Each register of local vector register file 524 can be read as 32-bits scalar data (designated registers L0 to L15 701), 64-bits of scalar data (designated registers EL0 to EL15 711) or 256-bit vector data (designated registers VL0 to VL15 721). All vector instructions of all functional units can write to local vector register file 524. Only instructions of arithmetic unit 513 and arithmetic unit 514 may read from local vector register file 524.

FIG. 9 illustrates local register file 525. There are 16 independent 64-bit wide registers. Each register of local register file 525 can be read as 32-bits scalar data (designated registers D0 to D15 701) or 64-bits of scalar data (designated registers ED0 to ED15 711). All scalar and vector instructions of all functional units can write to local register file 525. Only instructions of load/store unit 515 may read from local register file 525. Any vector instructions can also write 64-bit data to local register file 525 with the upper 192 bit data of the result vector discarded. Any vector instructions can also read 64-bit data from the 64-bit local register file 525 registers. The return data is zero-extended in the upper 192-bit to form an input vector. The registers of local register file 525 can only be used as addresses in load/store instructions, not as store data or as sources for 64-bit arithmetic and logical instructions of load/store unit 515.

FIG. 10 illustrates the predicate register file 517. There are sixteen registers 32-bit registers in predicate register file 517. Predicate register file 517 contains the results from vector comparison operations executed by either arithmetic and is used by vector selection instructions and vector predicated store instructions. A small subset of special instructions can also read directly from predicate registers, performs operations and write back to a predicate register directly. There are also instructions which can transfer values between the global register files (521 and 522) and predicate register file 517. Transfers between predicate register file 517 and local register files (523, 524 and 525) are not supported. Each bit of a predication register (designated P0 to P15) controls a byte of a vector data. Since a vector is 256-bits, the width of a predicate register equals 256/8=32 bits. The predicate register file can be written to by vector comparison operations to store the results of the vector compares.

A CPU such as CPU 110, 210, 220, 310, 410 or 420 operates on an instruction pipeline. This instruction pipeline can dispatch up to nine parallel 32-bits slots to provide instructions to the seven execution units (multiply unit 511, correlation unit 512, arithmetic unit 513, arithmetic unit 514, load/store unit 515, branch unit 516 and predication unit 517) every cycle. Instructions are fetched instruction packets of fixed length further described below. All instructions require the same number of pipeline phases for fetch and decode, but require a varying number of execute phases.

Figure 11:
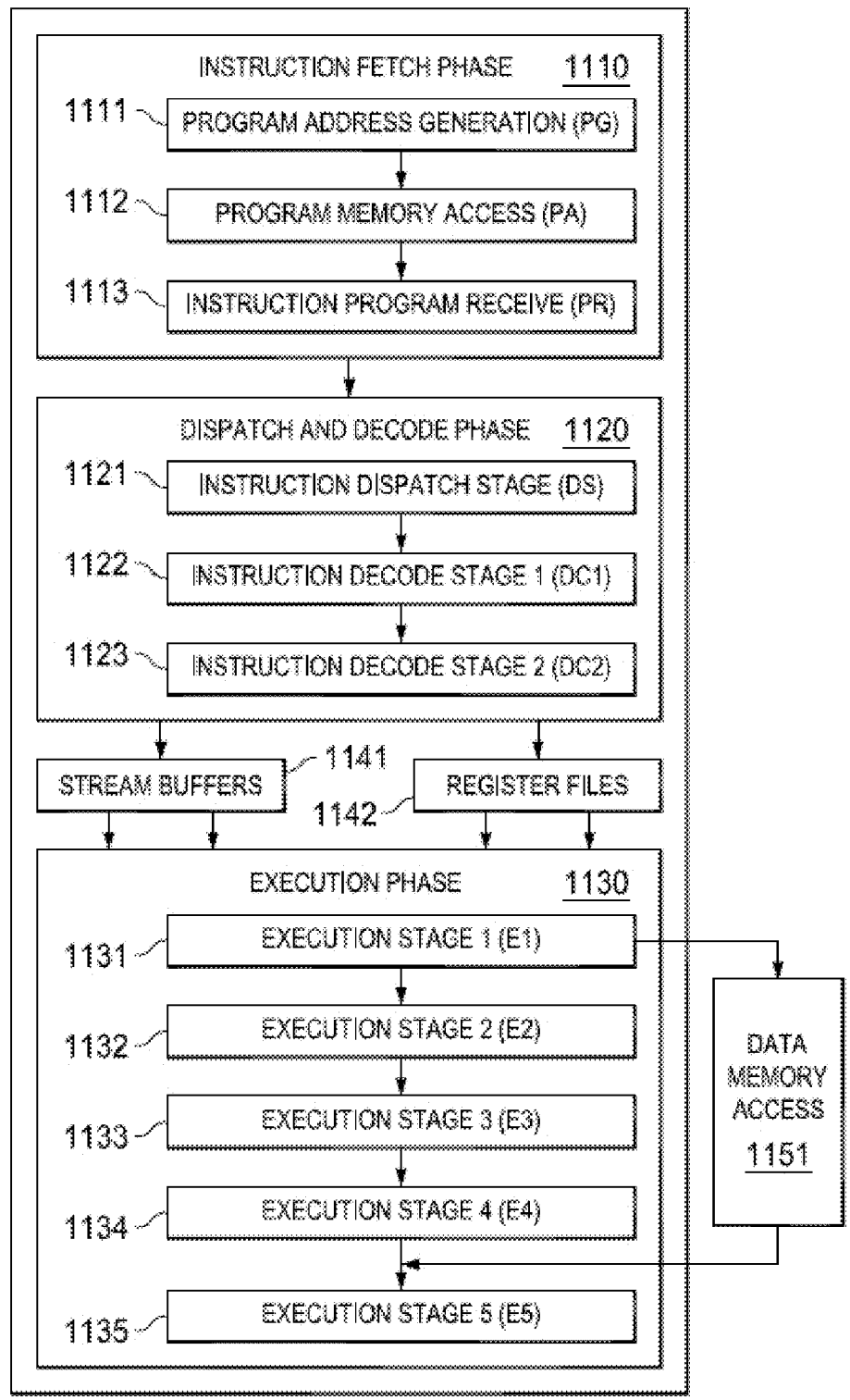
FIG. 11 illustrates the pipeline phases of the central processing unit according to a preferred embodiment of this invention.

FIG. 11 illustrates the following pipeline phases: program fetch phase 1110, dispatch and decode phases 1120 and execution phases 1130. Program fetch phase 1110 includes three stages for all instructions. Dispatch and decode phases 1120 include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in the CPU and the read request is sent to the memory controller for the level one instruction cache L1I. During the program access stage 1112 (PA) the level one instruction cache L1I processes the request, accesses the data in its memory and sends a fetch packet to the CPU boundary. During the program receive stage 1113 (PR) the CPU registers the fetch packet.

Instructions are always fetched sixteen words at a time. FIG. 12 illustrates this fetch packet. FIG. 12 illustrates 16 instructions 1201 to 1216 of a single fetch packet. Fetch packets are aligned on 512-bit (16-word) boundaries. The execution of the individual instructions is partially controlled by a p bit in each instruction. This p bit is preferably bit 0 of the instruction. The p bit determines whether the instruction executes in parallel with another instruction. The p bits are scanned from lower to higher address. If the p bit of an instruction is 1, then the next following instruction is executed in parallel with (in the same cycle as) that instruction I. If the p bit of an instruction is 0, then the next following instruction is executed in the cycle after the instruction. All instructions executing in parallel constitute an execute packet. An execute packet can contain up to nine instructions. Each instruction in an execute packet must use a different functional unit. An execute packet can contain up to nine 32-bit wide slots. A slot can either be a self-contained instruction or expand the constant field specified by the immediate preceding instruction. A slot can be used as conditional codes to apply to the instructions within the same fetch packet. A fetch packet can contain up to 2 constant extension slots and one condition code extension slot.

There are up to 11 distinct instruction slots, but scheduling restrictions limit to 9 the maximum number of parallel slots. The maximum nine slots are shared as follows: multiply unit 511; correlation unit 512; arithmetic unit 513; arithmetic unit 514; load/store unit 515; branch unit 516 shared with predicate unit 517; a first constant extension; a second constant extension; and a unit less instruction shared with a condition code extension. The last instruction in an execute packet has a p bit equal to 0.

The CPU and level one instruction cache L1I pipelines are de-coupled from each other. Fetch packet returns from level one instruction cache L1I can take different number of clock cycles, depending on external circumstances such as whether there is a hit in level one instruction cache L1I. Therefore program access stage 1112 (PA) can take several clock cycles instead of 1 clock cycle as in the other stages.

Dispatch and decode phases 1120 include instruction dispatch to appropriate execution unit stage 1121 (DS), instruction pre-decode stage 1122 (DC1); and instruction decode, operand reads stage 1123 (DC2). During instruction dispatch to appropriate execution unit stage 1121 (DS) the fetch packets are split into execute packets and assigned to the appropriate functional units. During the instruction pre-decode stage 1122 (DC1) the source registers, destination registers, and associated paths are decoded for the execution of the instructions in the functional units. During the instruction decode, operand reads stage 1123 (DC2) more detail unit decodes are done, as well as reading operands from the register files.

Execution phases 1130 includes execution stages 1131 to 1135 (E1 to E5). Different types of instructions require different numbers of these stages to complete their execution. These stages of the pipeline play an important role in understanding the device state at CPU cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG phase is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the CPU boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

FIG. 13 illustrates an example of the instruction coding of instructions used by this invention. Each instruction consists of 32 bits and controls the operation of one of the individually controllable functional units (multiply unit 511, correlation unit 512, arithmetic unit 513, arithmetic unit 514, load/store unit 515). The bit fields are defined as follows. The creg field and the z bit are optional fields used in conditional instructions. These bits are used for conditional instructions to identify the predicate register and the condition. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field and the z field are encoded in the instruction as shown in Table 2.

TABLE 2

| | Conditional Register | | | |
|---|---|---|---|---|
| | | creg | | z |
| | 31 | 30 | 29 | 28 |
| Unconditional | 0 | 0 | 0 | 0 |
| Reserved | 0 | 0 | 0 | 1 |
| A0 | 0 | 0 | 1 | z |
| A1 | 0 | 1 | 0 | z |
| A2 | 0 | 1 | 1 | z |
| A3 | 1 | 0 | 0 | z |
| A4 | 1 | 0 | 1 | z |
| A5 | 1 | 1 | 0 | z |
| Reserved | 1 | 1 | x | x |

Note that "z" in the z bit column refers to the zero/not zero comparison selection noted above and "x" is a don't care state. This coding can only specify a subset of the 16 global scalar registers as predicate registers. This selection was made to preserve bits in the instruction coding. Note that unconditional instructions do not have these optional bits. For unconditional instructions these bits (28 to 31) are preferably used as additional opcode bits. However, if needed, an execute packet can contain a unique 32-bit condition code extension slot which contains the 4-bit creg/z fields for the instructions which are in the same execute packet. Table 3 shows the coding of such a condition code extension slot.

TABLE 3

| Bits | Functional Unit |
|---|---|
| 3:0 | .L |
| 7:4 | .S |
| 11:5 | .D |
| 15:12 | .M |
| 19:16 | .C |
| 23:20 | .B |
| 28:24 | Reserved |
| 31:29 | Reserved |

Thus the condition code extension slot specifies bits decoded in the same way the creg/z bits assigned to a particular functional unit in the same execute packet.

Special vector predicate instructions use the designated predicate register to control vector operations. In the current embodiment all these vector predicate instructions operate on byte (8 bit) data. Each bit of the predicate register controls whether a SIMD operation is performed upon the corresponding byte of data. The operations of predicate unit 517 permit a variety of compound vector SIMD operations based upon more than one vector comparison. For example a range determination can be made using two comparisons. A candidate vector is compared with a first vector reference having the minimum of the range packed within a first data register. A second comparison of the candidate vector is made with a second reference vector having the maximum of the range packed within a second data register. Logical combinations of the two resulting predicate registers would permit a vector conditional operation to determine whether each data part of the candidate vector is within range or out of range.

The dst field specifies a register in a corresponding register file as the destination of the instruction results.

The src2 field specifies a register in a corresponding register file as the second source operand.

The src1/cst field has several meanings depending on the instruction opcode field (bits 2 to 12 and additionally bits 28 to 31 for unconditional instructions). The first meaning specifies a register of a corresponding register file as the first operand. The second meaning is an immediate constant. Depending on the instruction type, this is treated as an unsigned integer and zero extended to a specified data length or is treated as a signed integer and sign extended to the specified data length.

The opcode field (bits 2 to 12 for all instructions and additionally bits 28 to 31 for unconditional instructions) specifies the type of instruction and designates appropriate instruction options. This includes designation of the functional unit and operation performed. A detailed explanation of the opcode is beyond the scope of this invention except for the instruction options detailed below.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Correlation unit 512 and arithmetic units 513 and 514 often operate in a single instruction multiple data (SIMD) mode. In this SIMD mode the same instruction is applied to packed data from the two operands. Each operand holds plural data elements disposed in predetermined slots. SIMD operation is enabled by carry control at the data boundaries. Such carry control enables operations on varying data widths.

FIG. 14 illustrates the carry control. AND gate 1401 receives the carry output of bit N within the operand wide arithmetic logic unit (256 bits for arithmetic units 513 and 514, 512 bits for correlation unit 512). AND gate 1401 also receives a carry control signal which will be further explained below. The output of AND gate 1401 is supplied to the carry input of bit N+1 of the operand wide arithmetic logic unit. AND gates such as AND gate 1401 are disposed between every pair of bits at a possible data boundary. For example, for 8-bit data such an AND gate will be between bits 7 and 8, bits 15 and 16, bits 23 and 24, etc. Each such AND gate receives a corresponding carry control signal. If the data size is of the minimum, then each carry control signal is 0, effectively blocking carry transmission between the adjacent bits. The corresponding carry control signal is 1 if the selected data size requires both arithmetic logic unit sections. Table 4 below shows example carry control signals for the case of a 256 bit wide operand such as used in arithmetic units 513 and 514 which may be divided into sections of 8 bits, 16 bits, 32 bits, 64 bits or 128 bits. No control of the carry output of the most significant bit is needed, thus only 31 carry control signals are required.

TABLE 4

| Data Size | Carry Control Signals | | | | | | | |
| --- | --- | --- | --- | --- | --- | --- | --- | --- |
| 8 bits | –000 | 0000 | 0000 | 0000 | 0000 | 0000 | 0000 | 0000 |
| 16 bits | –101 | 0101 | 0101 | 0101 | 0101 | 0101 | 0101 | 0101 |
| 32 bits | –111 | 0111 | 0111 | 0111 | 0111 | 0111 | 0111 | 0111 |
| 64 bits | –111 | 1111 | 0111 | 1111 | 0111 | 1111 | 0111 | 1111 |
| 128 bits | –111 | 1111 | 1111 | 1111 | 0111 | 1111 | 1111 | 1111 |
| 256 bits | –111 | 1111 | 1111 | 1111 | 1111 | 1111 | 1111 | 1111 |

It is typical in the art to operate on data sizes that are integral powers of 2 ($2^N$). However, this carry control technique is not limited to integral powers of 2. One skilled in the art would understand how to apply this technique to other data sizes and other operand widths.

Figure 15:
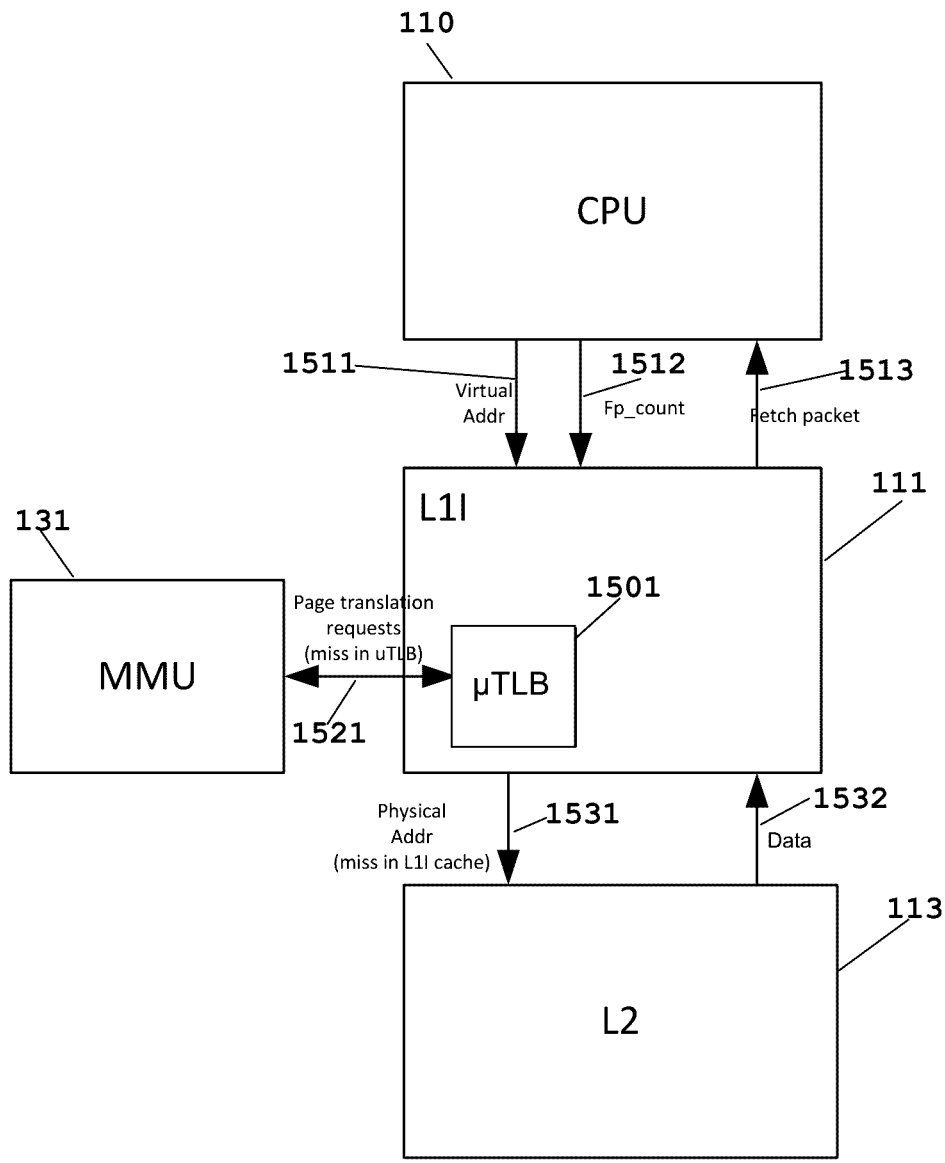
FIG. 15 illustrates the relationship of key parts of this invention.

FIG. 15 illustrates the key parts of this invention. FIG. 15 employs reference numerals from the scalar single core example of FIG. 1 for simplicity of illustration. Those skilled in the art would realize this invention could be practiced with any of the examples illustrated in FIGS. 1 to 4. In particular, this invention can be practiced with the dual processor examples illustrated in FIGS. 2 and 4 with the level two unified cache shared between the dual processors. Central processing unit (CPU) 110 is coupled to level one instruction cache (L1I) 111. Level one instruction cache 111 is further connected to memory management unit (MMU) 131 corresponding to the memory controller 131 illustrated in FIG. 1 and to L2 cache 113. FIG. 15 illustrates micro table look-aside buffer (μTLB) 1501 included as part of L1I cache 111. FIG. 15 illustrates the following signals passed between CPU 110 and L1I cache 111: virtual address 1511; fetch packet count 1512; and fetch packet 1513. FIG. 15 illustrates bidirectional data flow between L1I cache 111 and MMU 131 including: page translations requests 1521; and page translation entries. FIG. 15 illustrates the following signals passed between L1I cache 111 and L2 cache 113; physical address 1531; and data 1532.

Figure 16:
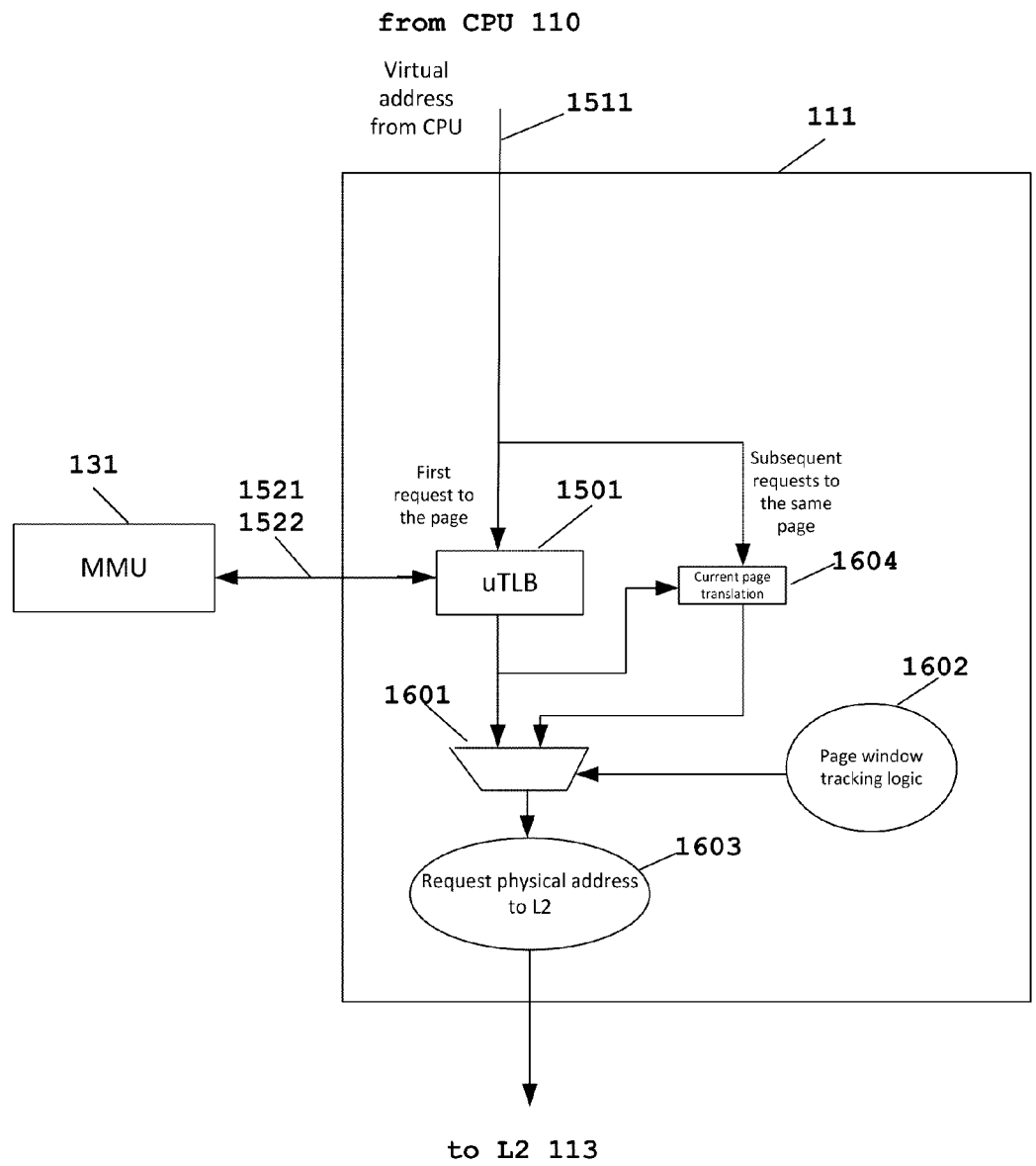
FIG. 16 schematically illustrates the virtual to physical address translation of this invention.

FIG. 16 illustrates some parts of L1I cache 111. In this example CPU 110 operates employing a virtual address. L1I cache 111 also employs virtual addresses. L2 cache 113 employs physical addresses. Accesses to L2 cache 113 from CPU 110 must undergo address translation from a virtual address to a physical address. Note some parts of L1I cache 111 are omitted for clarity of illustration.

The following example illustrates the invention. Assume sequential instruction addresses A0, A1, A2 . . . belong to the same page. Initially the virtual address 1511 for A0 from CPU 110 is supplied to L1I cache 111. L1I cache 111 determines if it stores instructions at address A0. This invention deals with the case where there is a L1I cache miss and L1I cache 111 does not store the requested instructions. This request is passed to L2 cache 113 for service. This request requires address translation as noted above.

Address translation is typically performed using a table of most significant bits of virtual addresses and the corresponding most significant bits of physical addresses. Upon detecting the correct address pair, the translation substitutes the most significant physical address bits for the most significant virtual address bits. It is typical that the least significant bits of the virtual address are the same as the least significant bits of the physical address. In this invention the virtual address/physical address translation table is stored in MMU 131. The page translation table stored in MMU 131 typically includes: a virtual address; the corresponding physical address; an indication of the page size; and access permissions for this memory page.

L1I cache 111 includes μTLB 1501 which stores some of the translation table entries in a cache-like fashion. When servicing an address translation, the requested virtual address 1511 is compared with translation table entries stored in μTLB 1501. If virtual address 1511 matches a table entry in μTLB 1501 (hit), the matching table entry is used for address translation. Multiplexer 1601 supplies the translated physical address to L2 cache 113 via request physical address to L2 unit 1603. Note this request is conditional on a cache miss in L1I cache 111. Supply of a physical address to L2 cache 113 is not required on a L1I cache hit, because this hit indicates the memory access can be serviced from L1I cache 111. The tag RAMS making the cache hit/miss determination and the data RAM storing cached data are not illustrated in FIG. 16 and are conventional. Upon such a μTLB hit, the address translation is performed in a single cycle.

If virtual address 1511 does not match any table entry in μTLB 1501, then the translation parameters must be fetched from the MMU 131. It may require tens or hundreds of cycles to perform this fetch depending on the page translation and page table walk latency in MMU 131. MMU 131 finds the corresponding address translation entry and returns this entry 1522 to μTLB 1501. μTLB 1501 stores this newly fetched translation entry, typically casting out an entry currently stored in μTLB 1501 to make room.

In instruction fetching, memory access will often be to the same page or a limited set of pages. Following return of the physical address translation and the permission information for the initial page, that information is stored locally in current page translation register 1604. The translation and permission data stored in current page translation register 1604 is used for subsequent requests to the same page. Upon access to later memory locations at A1, A2 . . . the address translation is performed according to data stored in current page translation register 1604. Page window tracking logic 1602 controls the source of the translated physical address. For the first request to a page, page window tracking logic 1602 selects the physical address from µTLB 1501. For subsequent requests to the same page, page window tracking logic 1602 selects the physical address from current page translation register 1604.

This invention stores the current page translation for the entire window the current page is accessed in the program memory controller thereby skipping subsequent µTLB lookups for the same page. Because fetch addresses are generally sequential in the program memory controller, this allows the L1I controller to store the page translation and permissions information for the entire window of accesses to the same page.

The alternative to this invention sends each translation request including all requests in the page to µTLB 1501. This results in increased dynamic power and is susceptible to any µTLB updates from MMU. Note that current page translation register 1604 effectively provides an additional layer of caching to the page translation entry. Since current page translation register 1604 includes a single entry at a single address, determining an address match between the current fetched address and the page can be performed faster using less power than with µTLB 1501. Likewise on a page hit, the address translation and permission data in current page translation register 1604 can be accessed faster using less power than with µTLB 1501.

In this invention, the µTLB latency caused by back to back access to same page is minimized. In this invention, there is no latency impact on program requests if µTLB 1501 entries are invalidated while L1I cache 111 is requesting addresses in that same page. This is because the translation and permission data corresponding to the current page are separately stored in current page translation register 1604. If µTLB 1501 is implemented as static random access memory (SRAM), this invention reduces the dynamic power of every µTLB access to the current page significantly.

What is claimed is:

1. A method of address translation comprising the steps of:
    storing only a single address translation entry in a current page translation register, said signal address translation entry consisting of a first predetermined number of address bits in a first address domain and a corresponding second predetermined number of address bits in a second address domain;
    receiving a first address of a memory access in a said first address domain;
    determining if said first address corresponds to the single address translation entry stored in the current page translation register by detecting if a first predetermined most significant bits of said first address matches said first predetermined number of address bits in first address domain of said single address translation entry; and
    if said first address corresponds to the single address translation entry stored in the current page translation register, translating said first address into a second address in a second address domain corresponding to said single address translation entry stored in a current page translation register by substituting said second predetermined number of address bits in said second address domain of the single address translation entry for said first predetermined most significant bits of said first address.

2. The method of address translation of claim 1, further comprising the steps of:
    storing a plurality of address translation entries in a micro translation look-aside buffer, each entry consisting of said first predetermined number of address bits in said first address domain and a corresponding second predetermined number of address bits in said second address domain;
    if said first address does not correspond to the first address translation entry stored in the current page translation register
        searching the micro translation look-aside buffer for an address translation entry having said first predetermined bits in said first address domain matching said first predetermined most significant bits number of said first address, and
        if the micro translation look-aside buffer stores an address translation entry corresponding to said first address
            translating said first address to a second address in a second domain according to said address translation entry corresponding to said first address by substituting said second predetermined number of address bits in said second address domain of the address translation entry corresponding to the first address for said first predetermined most significant bits of said first address, and
            storing the address translation entry corresponding to said first address in the current page translation register.

3. The method of address translation of claim 2, further comprising the steps of:
    storing all possible address translation entries in a memory management unit; and
    if an address translation entry corresponding to said first address is not stored in said micro translation look-aside buffer
        recalling an address translation entry having said first predetermined bits in said first address domain matching said first predetermined most significant bits number of said first address from the memory management unit,
        translating said first address to a second address in a second domain according to said recalled address translation entry by substituting said second predetermined number of address bits in said second address domain of the recalled address translation entry for said first predetermined most significant bits of said first address,
        storing said recalled address translation entry corresponding to said first address in the micro translation look-aside buffer, and
        storing said recalled address translation entry corresponding to said first address in the current page translation register.

4. The method of address translation of claim 3, wherein:
    said step of storing said recalled address translation entry corresponding to said first address in the micro translation look-aside buffer includes casting out one of the plurality of address translation entries stored in the micro translation look-aside buffer.

5. The method of address translation of claim 3, wherein:
said step of storing said recalled address translation entry corresponding to said first address in the current page translation register includes casting out the address translation entry stored in the current page translation register.

6. The method of address translation of claim 1, wherein:
said step of storing a single address translation entry in a current page translation register includes storing at a corresponding plurality of access permission bits corresponding to said single address translation entry; and
further comprising accessing a memory at the second address in the second address domain corresponding to said access permission bits.

7. An address translation circuit comprising:
a current page address translation register storing only a single page address translation entry consisting of a first predetermined number of address bits in a first address domain of a memory page address and a second predetermined number of address bits in a second address domain of address translation data corresponding to said memory page address, said current page address translation register operable to
receive a first address of a memory access in a first address domain,
determine if said first address corresponds to said memory page address stored in said current page translation register by detecting if a first predetermined most significant bits of said first address matches said first predetermined number of address bits in said first address domain of said memory page address, and
if said first address corresponds to said memory page address stored in said current page translation register, outputting said address translation data; and
an address translation unit connected to said current page address translation register and receiving said first address, said address translation unit operable to translate said first address into a second address in a second address domain corresponding to said address translation data output by said current page translation register by substituting said second predetermined number of address bits in said second address domain of said address translation data for said first predetermined most significant bits of said first address.

8. The address translation circuit of claim 7, further comprising:
a micro translation look-aside buffer storing a plurality of page translation entries, each consisting of a first predetermined number of address bits in a first address domain of a memory page address with a second predetermined number of address bits in a second address domain of corresponding address translation data, said micro translation look-aside buffer operable if said first address does not correspond to said memory page address stored in said current page translation register to
determine if one of the plural memory page addresses stored in said micro translation look-aside buffer corresponds to said first address by detecting if a first predetermined most significant bits of said first address matches said first predetermined number of address bits in said first address domain of any of said memory page addresses, and
if one of the plural memory page addresses stored in said micro translation look-aside buffer corresponds to said first address, supply said address translation data corresponding to said memory page address corresponding to said first address to said address translation unit, and
store said memory page address and said corresponding address translation data corresponding to said first address in said current page translation register.

9. The address translation circuit of claim 8, further comprising:
a memory management unit storing a plurality of page translation entry, one page translation entry corresponding to each possible memory page address and with corresponding address translation data, said memory management unit operable if said first address does not correspond to a memory page address stored in said micro translation look-aside buffer to
supply said address translation data corresponding to said memory page address corresponding to said first address to said address translation unit,
store said address translation data corresponding to said first address in the micro translation look-aside buffer, and
store said address translation data corresponding to said first address in the current page translation register.

10. The address translation circuit of claim 9, wherein:
said micro translation look-aside buffer is further operable to store said address translation data corresponding to said first address in the micro translation look-aside buffer by casting out one of said plurality of memory page addresses with corresponding address translation data.

11. The address translation circuit of claim 9, wherein:
said current page translation register is further operable to store said address translation entry corresponding to said first address in said current page translation register by casting out said memory page address and said corresponding address translation data stored therein.

12. The address translation circuit of claim 7, wherein:
said current page translation register is further operable to store a plurality of access permission bits corresponding to said single page address translation entry; and
further comprising a memory access unit connected to said current page translation register operable to access a memory at said second address in said second address domain corresponding to said permission bits.

* * * * *